K. A. PIHL.
SURFACE GRINDER.
APPLICATION FILED JULY 29, 1918.
1,366,932.
Patented Feb. 1, 1921.
2 SHEETS—SHEET 2.
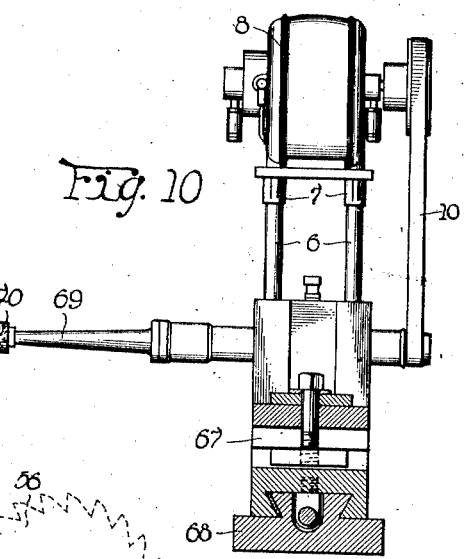
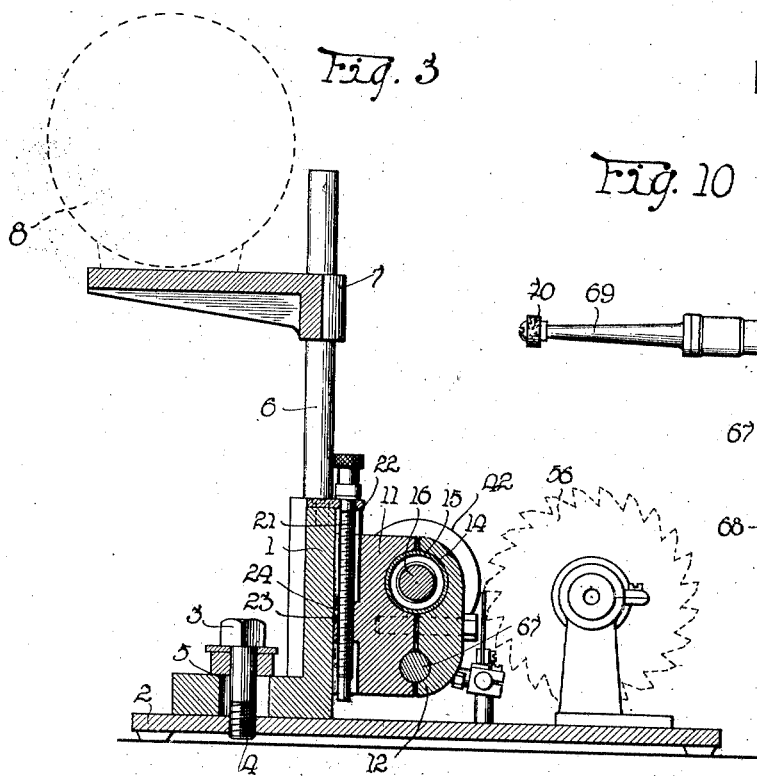
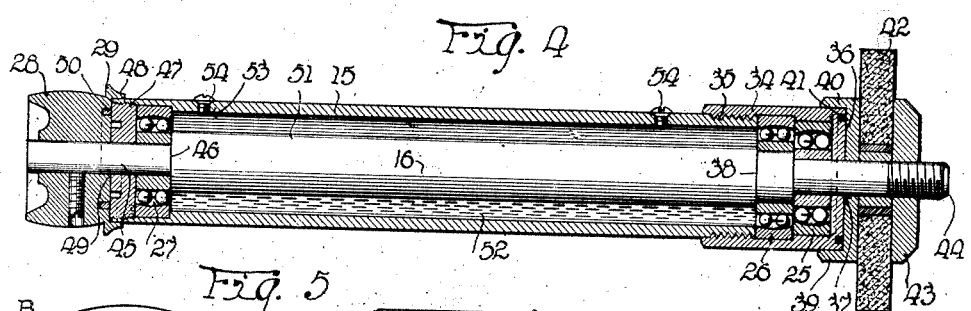
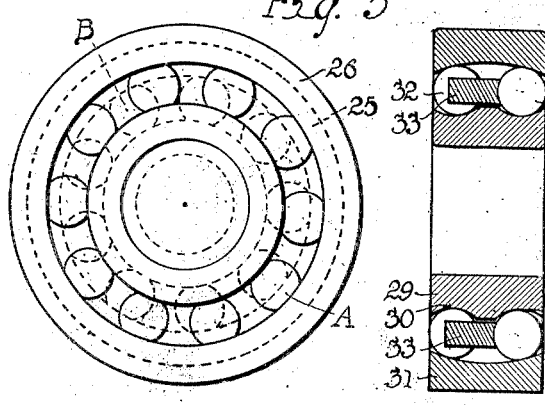
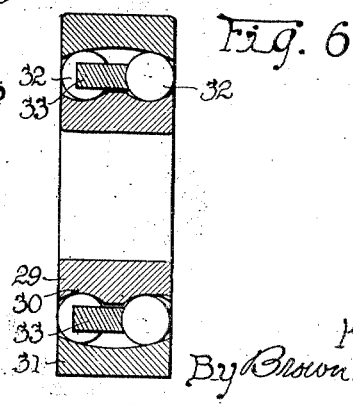
Inventor
Karl A. Pihl
By Brown Hanson & Boettcher
Attorneys

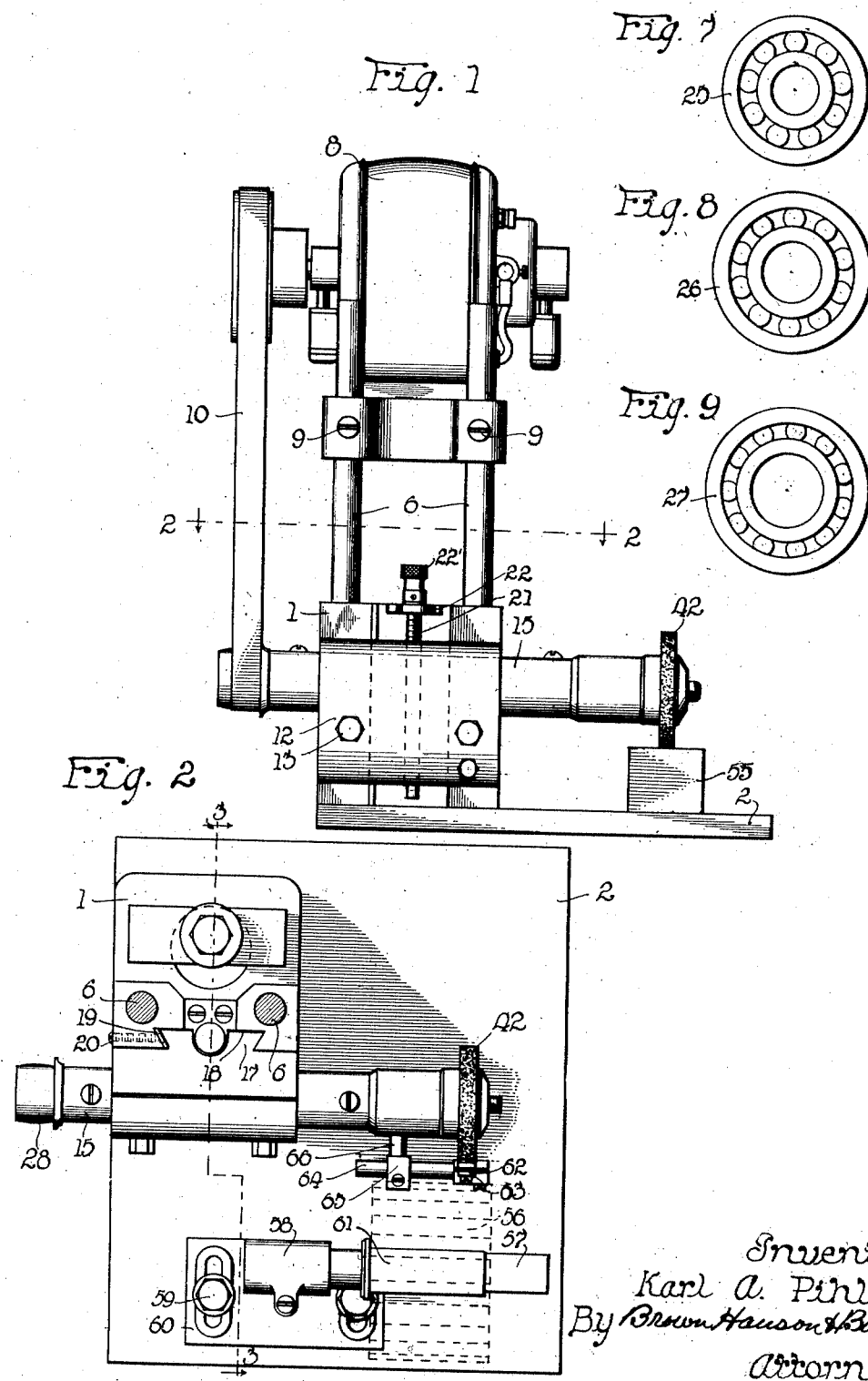

UNITED STATES PATENT OFFICE.

KARL A. PIHL, OF CHICAGO, ILLINOIS, ASSIGNOR TO SAPHIL MANUFACTURING CORPORATION, OF CHICAGO, ILLINOIS, A CORPORATION OF ILLINOIS.

SURFACE-GRINDER.

1,366,932.

Specification of Letters Patent.

Patented Feb. 1, 1921.

Application filed July 29, 1918. Serial No. 247,118.

*To all whom it may concern:*

Be it known that I, KARL A. PIHL, a citizen of the United States, residing at Chicago, in the county of Cook and State of Illinois, have invented a certain new and useful Improvement in Surface-Grinders, of which the following is a full, clear, concise, and exact description, reference being had to the accompanying drawings, forming a part of this specification.

My invention relates to improvements in grinders and has special reference to portable or semi-portable grinding machines.

In the development of accurate workmanship in metal structures and the use of hardened surfaces, especially in relation to high speed engines and machines, hardened gages and such like devices and tools, it has become necessary, in order to attain that accuracy of finished dimensions and surfaces required to accomplish this result by grinding processes.

This development has led to the production of many complicated and expensive grinding machines, which, while capable of doing a great variety of work are, nevertheless, costly machines, relative to the quantity of work which they are capable of turning out.

There is a field at the present time for a small, light, compact and easily applied grinding machine which shall be capable of independent use as a surface grinder or a milling tool sharpener, or as an attachment to a lathe or similar machine for internal grinding.

One feature which has militated against the production of a grinder of reasonable cost has been the bearings for the spindle which carries the grinding wheel. This spindle must necessarily run at very high speed in order to properly accomplish the grinding, and consequently the character of the bearings for the spindle and their lubrication play an important part in the accuracy of results to be obtained. Usually in the expensive machines spoken of, these bearings are of solid bronze and are oiled by some force feed system. Such bearings and system of oiling are not feasible for the cheaper grinders contemplated by me.

In the production of a grinder of the character contemplated, I conceived the idea of making use of the well known ball bearings for mounting the spindle, but I found upon trial that while the spindle would run at high speed and with little friction, the grinding wheel would produce upon the article being operated upon a series of wavy lines more or less irregular in shape and yet appearing to have a certain more or less regular sequence. These lines indicated not only that the surface had not a perfect appearance, but what was of more importance and which was proven later was actually not a true surface of the kind desired, either flat, cylindrical or otherwise.

I proved by the substitution of solid bronze bearings that these effects were due to the use of the ball bearings, but as the ball bearings, which can be made self alining are much cheaper than the bronze bearings, and much more easily maintained lubricated, I set about solving the difficulty.

I discovered that the difficulty arose from the fact that the number of balls in the rows of balls in the associated bearings on the spindle were the same, and that on this account certain sequences of relative positions were maintained as the balls followed in the direction of rotation of the spindle. This produced what might be termed a synchronism of action of vibration communicated to the spindle and to the grinding wheel carried thereby which in turn produced the wavy lined surface mentioned. The problem then became one easy to solve, as the necessity was simply to break up or prevent this synchronism of action and to cause the spindle to rotate more nearly as though mounted in a solid bronze bearing.

In my improved grinder I prevent such synchronism of action by associating ball bearings which do not have the same number of balls in their rings or rows of balls. In fact I vary the number preferably by one ball only providing one bearing with 9 balls and an adjacent bearing with 10 balls, and as the rings or rows of balls are independent of each other, as regards their movement around the spindle, as the spindle rotates, there is no definite relation or sequence in the points of support for the spindle provided by the several rows of balls, and consequently the detrimental synchronism of vibration cannot be set up. I have found in actual practice that my theoretical solution of the problem was correct for I am enabled, by means of my improved ball bearing grinder to produce surfaces which are absolutely true, either flat, cylindrical or of other shapes, as desired.

While I have particularly dwelt upon the feature of the bearings for the grinding wheel spindle, my improved grinder contains many other new features of value which will appear hereinafter.

My invention will be more readily understood by reference to the accompanying drawings forming part of this specification and in which:—

Figure 1 is a front elevation of the machine, arranged especially to do surface grinding on blocks and such like articles;

Fig. 2 is a plan section of the machine on the line 2—2 of Fig. 1, the machine shown equipped for grinding or sharpening milling cutters;

Fig. 3 is a vertical section of the machine on the line 3—3 of Fig. 2;

Fig. 4 is a central horizontal longitudinal sectional view of the wheel spindle and its housing;

Fig. 5 is an enlarged diagrammatic plan view of the roller bearings at the forward end of the spindle indicating the relative position of the balls of the associated ball bearings;

Fig. 6 is an enlarged vertical sectional view of one of the ball bearings;

Figs. 7, 8 and 9 are plan side elevations of the several ball bearings which I make use of; and Fig. 10 is a rear elevation of the machine illustrated as in position upon the carriage of the lathe and arranged for internal grinding.

In said drawings, 1 is a foundation L-shaped bracket upon and to which several of the associated parts of the machine are attached. This bracket is adapted to be secured upon a flat topped base plate 2 by means of a screw bolt 3, the plate being provided with a threaded opening 4 to receive the bolt. The bracket is provided with a relatively large opening 5 through which the bolt 3 passes and by means of which the bracket can be adjusted to some extent in its position upon the plate.

Rising from the bracket are two parallel posts 6 which extend vertically and are adapted to receive and have secured thereto, a shelf 7 upon which an electric motor 8 for driving the machine is adapted to be secured. This shelf 7 is adjustable up and down on the posts and is adapted to be secured in position by screws 9 for properly tensioning the belt 10 by which power is transmitted from the motor to the driving spindle of the machine. Mounted upon the face of the bracket 1 is a vertically movable box member 11, which is provided with a cap member 12. The cap is secured to the box member by two screw bolts 13 and together the two members are provided with a horizontal bore 14 for receiving the tubular casing 15, which carries the grinding spindle or shaft 16.

The tube 15 is adapted to be clamped solidly in position between the box and the cap in the bore 14 by the screw bolts 13.

The box 11 is mounted to be adjusted up and down or from and toward the base plate, by means of a vertical dove-tailed slide or projection 17 provided on the back of the box 11 and fitting within a similar guide slot or opening 18 provided in the face of the bracket. The box is maintained in close fitting non-shaking relation to the bracket by the usual gib 19 and adjusting screws 20.

The box is adjusted vertically by means of a vertical threaded screw 21 which is shouldered in a small bracket 22 secured to the bracket 1 and engages in a threaded opening 23 provided in a projection 24 formed with the box 11. When the screw 22 is rotated, and it is provided with a knurled finger knob 22′ at its upper end for this purpose, the box is adjusted vertically.

The grinding shaft 16 is mounted in the tubular casing or housing 15 by means of ball bearings 25, 26 and 27. I prefer to arrange these bearings as shown, two of them adjacent each other at the forward end of the shaft and one, larger than either of the other two, at the rear end of the shaft, adjacent to the belt pulley 28 which receives the driving belt 10 and by which the shaft 16 is driven.

The ball bearings each have an inner bearing ring 29 having two parallel ball grooves 30 and an outer bearing ring 31 which is spherical on its inner surface. Two parallel rows, 32 of balls, are provided, one for each of the grooves 30 and the balls in any one bearing are maintained properly and uniformly distributed around the bearing by a suitable ball retainer 33. The inner bearing ring in each instance is mounted on the spindle 16 and rotates with it and the outer ring in each instance is held stationary and substantially parallel with the inner ring by the casing or housing of the spindle. The inner spherical surfaces of the outer bearing rings permit the bearings to properly aline themselves in an obvious manner. As described the bearings 25 and 26 are arranged on the outer end of the shaft 16, they are mounted between the forward end of the tubular housing 15 and a cap member 34, which is threaded upon the forward end of the housing 15 at 35 and to the adjacent end of the tube 15. The outer end of the cap member is closed by a wall 36 which is provided with a central hole 37 which nicely fits the shaft at this point. The forward end of the shaft is reduced to provide a shoulder 38 against which the inner ring of the bearing 26 bears. The inner ring of the bearing 25 bears against the inner ring of the bearing 26 and said inner ring of the bearing 25 is held longitudinally in place by the end wall 36 of the cap 35. Upon the outer end of the shaft I provide a collar 39 which has a drive fit on the end of the shaft and is provided with a circumferential flange 40 surrounding the outer end of the cap member 34. This collar turns with the shaft and I provide means for preventing the escape of oil between the collar and the cap, beside the nice running fit I produce between these two members, which consists in a ring of felt 41, which I mount in a circumferential groove which I provide in the outer end of the cap 34 and adapted to bear on the adjacent face of the collar 39. The outer end of the shaft beyond the collar 39 is adapted to receive a grinding wheel 42 which is adapted to be tightly clamped in position by a screw threaded collar 43 which is threaded upon the screw threaded outer end 44 of the shaft.

At the rear end of the shaft the bearing 27 is mounted between the tubular casing 15 and the reduced rear end 45 of the shaft, and is held in position between the shoulder 46 on the shaft and a collar 47 which is screwed into the rear end of the housing tube. The belt pulley 28 is provided with a circumferential flange 48 adapted to lap over or inclose the rear end of the tube and such flange is provided with an outer circumferential rib 29 adapted to throw off any oil which might escape and prevent its getting to the belt 10. To prevent the escape of oil so far as possible, in addition to the close fit which I provide between the shaft and the central hole 49 in the collar 47, I provide a felt ring 50 in the inner face of the pulley and adapted to contact with the adjacent face of the collar 47.

The middle or main portion 51 of the shaft 16 is smaller in diameter than the internal diameter of the tubular housing and I thereby provide ample space 52 for oil. This space 52 opens freely at its ends to the ball bearings and I maintain the space nearly full of oil at all times, consequently all of the bearings run in oil. I provide oil filling openings 53 closed by screws 54 to prevent the entrance of any of the grinding dust from the wheel 42.

As described the shaft 16 with its associated parts is a unitary structure of rigid construction in which the shaft is mounted for free rotation and which is adapted to be mounted upon the machine by being clamped to the box 11 by the cap 12 and screws 13.

As best illustrated in Figs. 7, 8 and 9, I use 9 balls in each row of balls on the bearing 25 and in the adjacent bearing 26 I use 10 balls in each row. In the bearing 27 at the rear end of the spindle I use 11 balls in each row, as shown. While I have thus specified 9, 10 and 11 balls in the several bearings, it should be understood that the exact number of balls is not the essential feature, but that the number of balls in the rows of balls in the several bearings, being different from each other and preferably varying by one ball in each adjacent bearing, is more important than the exact number of balls in each bearing.

In Fig. 5 I have clearly illustrated the relation of the balls in the two adjacent bearings 25 and 26, the bearing 26 being shown in full lines and the bearing 25 being shown in overlying relation and in dotted lines. An examination of this figure will show at once the lack of any regularity in the relation between the positions of the several balls in the two bearings; for instance at $a$, a ball of each of the rings is in longitudinal alinement with the adjacent balls of the other ring, while at $b$ the ball of bearing 25 is substantially midway between the two adjacent balls of the bearing 26, and between these two positions the balls of the two rings are irregularly spaced. When it is understood that Fig. 5 illustrates one ring of balls only of each of the bearings 25 and 26, and that each bearing has a second row of balls spaced midway between the balls of the row shown, it will be understood that I not only provide rows of points of support which are not definite in their circumferential relation to each other, but that the two rows of balls in each of the bearings provides enough points of support so as to constitute a nearly circumferential or radial support for the spindle. The important point, however, is lack of any definite sequence in relation between the points of support afforded by the balls of one bearing as related to those afforded by the balls in the adjacent bearing, for no matter how many balls or rows of balls are provided, that is in the practical sense, we have not the continuous circumferential support given by a solid bronze bearing.

In Fig. 1 I have illustrated my improved grinder as being used for a surface grinder and wherein I illustrate a block 55 as being ground upon its upper face, the finished upper flat surface of the base 2 serving as a guide in moving the block back and forth beneath the grinding wheel to finish its whole upper surface. In this work it will be understood that the grinding wheel 42 can be readily adjusted from and toward the plate by means of the adjusting screw 21 to properly grind the block.

In Figs. 2 and 3 I have illustrated my improved grinder as arranged to sharpen the teeth of a milling cutter 56. For this purpose I provide a horizontal guide or spindle 57 rigidly mounted in a suitable bracket 58, removably bolted to the plate 2 by the bolts 59. The base 60 of the bracket 58 is slotted to receive the bolts 59 and to permit adjustment of the bracket and the spindle 57 relatively to the grinding wheel 42. As ordinary milling cutters have either a ⅞″ hole or a one inch hole to receive the spindles upon which they are mounted for use, I provide the spindle 57, ⅞″ in diameter and I provide a sleeve 61 adapted to slide on the spindle 57 and 1″ in outer diameter to receive the cutters having 1″ holes. To hold the cutters in proper relation to the grinding wheel I provide a light spring standard 62 adjustably mounted in a holder 63. The holder is adjustably mounted on a horizontal shaft 64 which in turn is clamped in a bracket 65. This clamping bracket is formed on the end of a short horizontal rod or shaft 66, which in turn is clamped upon the free end of a horizontal shaft 67 clamped between the box 11 and cap 12 similar to the clamping of the spindle housing 15 therein. These several shafts and clamps constituting the mounting of the standard or guide 62 permit a universal adjustment of this guide so as to position it relatively to the grinding wheel to suit any cutter to be ground. The standard itself rests at its lower end upon the plate 2, and any relative vertical adjustment of the standard and the wheel 42 to obtain the correct clearance on the teeth of the cutter is effected by raising and lowering the wheel as described. Having made the necessary adjustment, the cutter is placed upon the spindle 57 and the bracket 58 is adjusted so that the edges of the teeth of the cutter will be brought into grinding contact with the periphery of the grinding wheel. The standard serves to set the cutter wheel circumferentially as best shown in Fig. 3, wherein the tooth being ground is shown as having its forward face resting upon the top of the guide 62. In this position the cutter can be moved back and forth horizontally on the spindle 57 to grind the tooth its whole length, after which the cutter can be rotated to bring the next tooth into grinding position, the standard 62 yielding to permit the teeth to pass in an obvious manner.

In Fig. 10 I have illustrated another use of my improved grinding machine. In this instance the bracket 1, instead of being bolted to the base plate 2 is mounted on the tool post 67 of a carriage 68, of an engine lathe. In this position it will be understood the bracket with the motor 8 and the grinding spindle 16 can be moved back and forth as a unit and given the various relative movements which can be given to a tool on an engine lathe. For this use I have illustrated the device as provided with a long, relatively light extension spindle 69 secured upon the outer end of the spindle 16 and provided with a relatively small grinding wheel 70 mounted on the outer end of the spindle for use in internal grinding.

The article to be operated upon can be mounted upon the face plate (not shown) of the lathe, upon which the device is being used.

It will be seen that my device is especially adapted for use as a semi-portable unit grinder for surface grinding and for grinding milling cutters and the like, and is also eminently adapted for use on an engine lathe for either external or internal cylindrical grinding.

As many modifications of my invention will readily suggest themselves to one skilled in the art, I do not limit or confine my invention to the specific structures herein shown and described.

I claim:

A semi-portable grinding machine comprising a flat topped base plate, a right angle bracket secured to the base with one leg extending at a right angle to the plate, a housing dove-tailed to the bracket and movable from and toward the base plate, a screw for adjusting the position of the housing, a casing rigidly mounted in the housing parallel with the base plate, a grinding wheel shaft rotatably mounted in the casing on antifriction bearings arranged at the ends of the casing, a grinding wheel secured on one end of the shaft and a pulley on the opposite end of the shaft, standards rising from the brackets, an electric motor adjustably mounted on the standards, the motor having a pulley for coöperation with the pulley on the grinding wheel shaft for receiving a belt.

In witness whereof, I hereunto subscribe my name this 23rd day of July, 1918.

KARL A. PIHL.